Nov. 18, 1941.  R. P. MATTERN ET AL  2,262,954
DEHUMIDIFYING SYSTEM
Filed March 30, 1938  2 Sheets-Sheet 1

INVENTORS
*Raymond P. Mattern*
*William L. McGrath*
BY *George H. Fisher*
ATTORNEY Nov. 18, 1941.  R. P. MATTERN ET AL  2,262,954
DEHUMIDIFYING SYSTEM
Filed March 30, 1938   2 Sheets-Sheet 2

INVENTOR
*Raymond P. Mattern*
*William L. McGrath*
BY *George H. Fisher*
ATTORNEY Patented Nov. 18, 1941

2,262,954

UNITED STATES PATENT OFFICE 2,262,954

DEHUMIDIFYING SYSTEM

Raymond P. Mattern, Minneapolis, and William L. McGrath, St. Paul, Minn., assignors to Minneapolis-Honeywell Regulator Company, Minneapolis, Minn., a corporation of Delaware Application March 30, 1938, Serial No. 198,986

6 Claims. (Cl. 261—3)

This invention relates to dehumidifying systems and more particularly to a system of the type employing a hygroscopic element for removing moisture from the atmosphere.

In a system of this type, it is customary to spray a solution of hygroscopic element, such as lithium chloride into the air to be dried, thereby removing an amount of moisture, this amount being dependent upon the concentration of the hygroscopic fluid, and to maintain the hygroscopic fluid sufficiently concentrated by circulating the same or a portion of the same through a regenerator, in which some of the water vapor is driven off from the solution. In order that the hygroscopic fluid does not "freeze" or become crystallized after it has been regenerated, care must be taken that the concentration of the solution does not rise above a definite value, which value depends upon the particular hygroscopic element which is used.

One of the objects of our invention is the provision of an improved control system for a dehumidifying system of the type above discussed.

More specifically, it is an object of the invention to provide a device by which the concentration of the hygroscopic fluid is measured by comparing it with a solution of known concentration, and by such device to control the amount of heat to the regenerator to maintain the concentration at a fixed amount.

A further object is the provision of an improved device for measuring the concentration of a solution.

Another object is to provide, in a system of the type above described, improved control means including a humidity controller for controlling the supply of heat to the regenerator in a manner to maintain a substantially constant humidity in the space to be controlled, and a device responsive to the concentration of the solution acting as a limit control to reduce the supply of heat to the regenerator should the concentration rise to a predetermined value.

Another object of this invention is the provision of improved control means for a dehumidifying system of the type described, wherein the heat supply to the regenerator is controlled by a device responsive to the concentration of the solution being sprayed into the air to be dehumidified, and a space humidity responsive device also in control of the heat supply compensating the effect of the solution concentration responsive device.

A further object of the invention is in the provision of an improved means for maintaining the concentration of a solution at a fixed value by means of a device having two compartments separated by a wall including osmotic material, a liquid of known concentration in one compartment, the solution to be controlled in the other compartment, and operating the concentration changing means in accordance with the varying osmotic action of the liquid occasioned by the varying concentration of the concentrated solution.

Further objects will become apparent upon an examination of the specification claims and drawings, in which like reference characters represent like parts in the two views, and in which, Figure 1 is a diagrammatic view of one form of the system embodying our invention;

Figure 1:
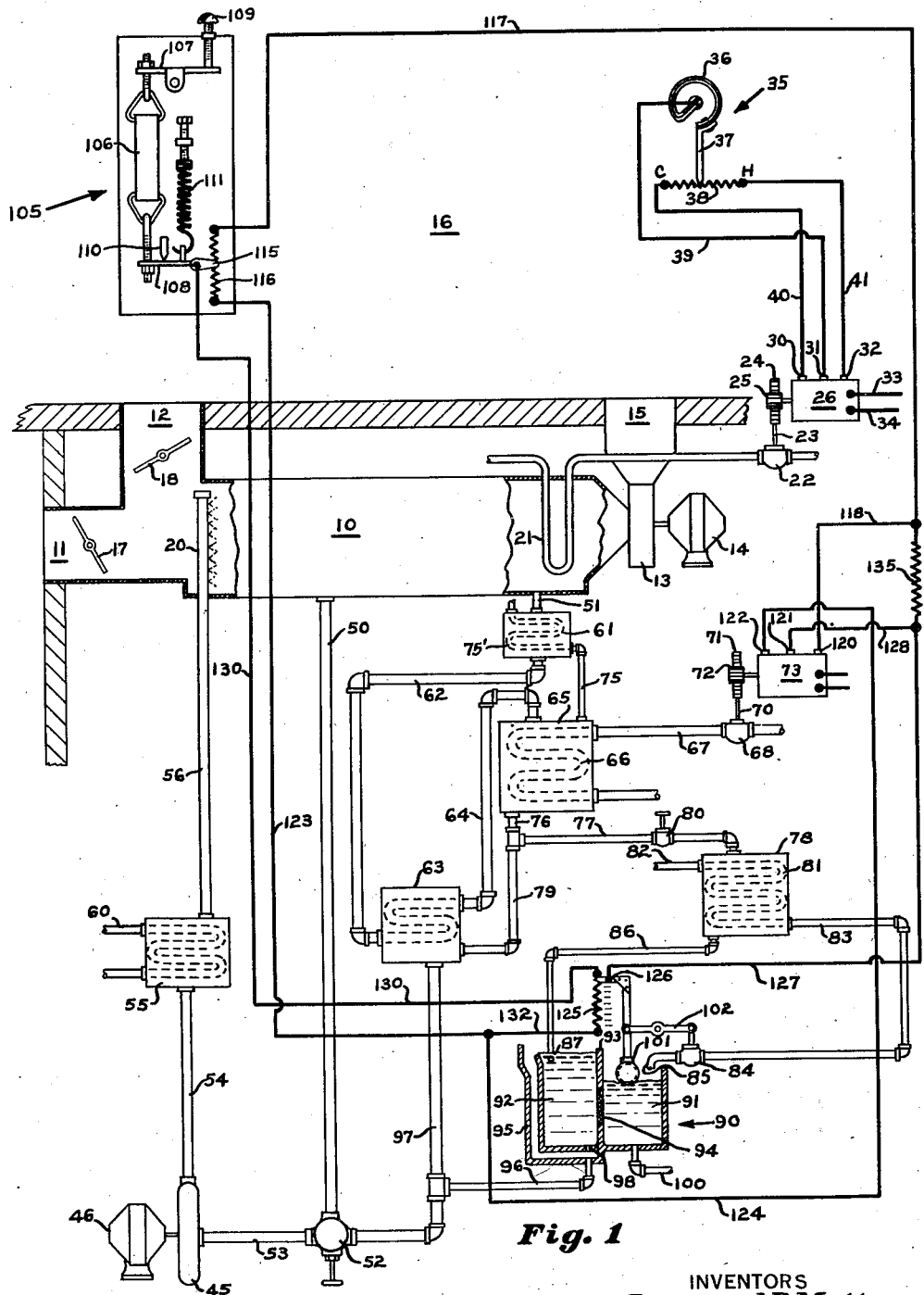

Referring to Figure 1, an air conditioning chamber is represented by the reference character 10. This chamber may include a fresh air inlet 11, a return air inlet 12, a fan 13 driven by a motor 14 for drawing air through the chamber 10 and exhausting it through a discharge outlet 15 into a space 16. The proportion of fresh and return air drawn into the chamber 10 through inlets 11 and 12 may be controlled by dampers 17 and 18, respectively. These dampers may be manually operated or automatically operated in any well known manner.

A spray 20 is located in the chamber 10 at a point where the fresh and return air entering the chamber is mixed, suitable hygroscopic fluid being sprayed into the chamber 10 by the spray 20 for removing moisture from the air within the chamber. The removal of moisture by hygroscopic fluid is accompanied by an increase in the temperature of the air from which the moisture is removed and a cooling coil 21 is provided to reduce the temperature of the air within the chamber before it is passed into the space 16 by the fan 13. Any suitable cooling medium may be passed through the coil 21, a valve 22 being provided to control the flow of the cooling medium through the cooling coil. Valve 22 may include a valve stem 23 to which is connected a rack 24 cooperating with a pinion 25 which is driven by a motor 26.

Motor 26 may be a proportioning motor of the type shown in Patent 2,028,110 issued January 14, 1936, to D. G. Taylor. Such a motor includes a pair of field windings selectively energized for causing rotation of the motor in one direction or the other. For controlling the energization of the two field windings, the motor includes a pair of balanced opposed relay coils which are connected together at one end, the junction of these coils being connected to terminal 31 located on the outside of the motor. Terminals 30 and 32 are connected to the opposite ends of these relay coils. Power may be supplied to the motor through conductors 33 and 34 which lead to any suitable source of power (not shown). A thermostat 35 may be located in the space 16 or if desired could be located in the return air duct 12 and this thermostat may include a bimetallic element 36 and an arm 37 carried thereby and passing over a resistance element 38 in response to changes in temperature in the space 16. The bimetallic element 36 is connected by conductor 39 to the terminal 31 of the motor which is connected to the junction of the aforedescribed relay coils. Conductors 40 and 41 connect the ends of the resistance 38 to the opposite ends of the relay coils by means of terminals 30 and 32. The opposite ends of these relay coils are also connected to the conductors 33 and 34 leading to the source of power. As the arm 37 of thermostat 35 passes over the resistance 38, the resistance in parallel with one relay coil will increase while the resistance in parallel to the other relay coil will decrease, thus causing the energization of one of the field windings and causing a rotation of the motor in one direction. A second potentiometer coil is included in the motor 26 and is connected in parallel with the potentiometer 38 to the relay coils. The arm of this potentiometer is driven by the motor 26 and moves in reverse relationship with respect to the arm 37 of thermostat 35 so that after the arm of this potentiometer has moved a distance corresponding to the movement of arm 37 over resistance 38, the resistance in parallel with the relay coils will become equal, the relay coils will be equally energized, and the motor 26 will come to rest. It will, therefore, be seen that the amount of opening of the valve 22 will be proportional to the extent of movement of arm 37 over resistance 38, or in other words, proportional to the temperature change in the space 16, the arrangement being such that as the temperature in the space increases, and arm 37 moves to the right, valve 22 moves towards open position and in response to a decrease in temperature in the space, and movement of arm 37 to the left, the valve 22 moves in the reverse direction.

A pump 45 driven by a motor 46 is provided for supplying a suitable hygroscopic fluid to the spray 20. Any suitable hygroscopic fluid such as lithium chloride may be used. Fluid flows to the pump 45 from the chamber 10 through suitable outlet pipes 50 and 51. Pipe 50 leads to a three-way mixing valve 52 whence it flows through pipe 53 to the inlet of pump 45, the fluid then being pumped through a pipe 54, a cooler 55 and a pipe 56 to the spray 20. Cooler 55 may be supplied by means of pipe 60 with any suitable cooling medium in order to reduce the temperature of the hygroscopic fluid so that it can remove a greater amount of moisture from the air within the chamber 10.

The fluid flowing through the pipe 51 flows through a heat exchanger 61, pipe 62, a second heat exchanger 63, pipe 64, and into a regenerator 65. This regenerator includes a coil 66 through which steam may flow through a pipe 67 controlled by a valve 68, this valve including a valve stem 70 connected to a rack 71. Pinion 72 driven by a motor 73 controls the position of the valve 68. This motor 73 may also be a proportioning motor of the same type as motor 26. It will be understood that the fluid passing from chamber 10 into regenerator 65 is relatively weak, having picked up a certain amount of moisture from the air, which moisture is driven off by the steam coil 66, this moisture passing through a pipe 75 and through a coil 75' in the heat exchanger 61 whereby the fluid flowing into the regenerator 65 is preheated. The now concentrated fluid leaving the regenerator 65 passes through outlet pipe 76, some of the fluid flowing through a pipe 77 into a heat exchanger 78, the rest of the fluid flowing through pipe 79 into the heat exchanger 63. The fluid flowing through pipe 79 will be relatively hot compared to the fluid flowing through pipe 62 so that the weak fluid flowing into the regenerator 65 is further preheated in the heat exchanger 63. The flow of fluid into the heat exchanger 78 may be controlled by a valve 80. A coil 81 is mounted within the heat exchanger 78 and water flows into this coil through a pipe 82 leaving the same through a pipe 83 whence it flows through a valve 84 to outlet 85. The now concentrated fluid which has passed through the heat exchanger 78 from the regenerator 65 flows through a pipe 86 to outlet 87.

A tank 90 is formed into compartments 91 and 92 by a wall 93. This wall includes a portion 94 formed of a suitable osmotic material. This material may be formed by precipitating copper ferrocyanide on a wall of unglazed porous material or may be formed in any other known suitable manner. The compartment 92 is filled with the concentrated fluid and may be allowed to overflow and empty into another compartment formed by a wall 95 which empties into a pipe 96 leading to a pipe 97 which is connected to the heat exchanger 63. A suitable outlet 98 is provided in the bottom of compartment 92 to allow the fluid in said compartment to flow out so that the fluid in this compartment is constantly being replaced by fresh concentrated fluid. Valve 84 is controlled by a suitable float 101 resting on the surface of the water in compartment 91, this float being operatively connected to the valve 84 by means of a pivoted lever 102. A suitable outlet 100 is provided at the bottom of the compartment 91.

The osmotic wall portion 94 permits the flow of water from compartment 91 of tank 90 into compartment 92 containing concentrated fluid by the well known principle of osmosis, the rate of flow through the wall portion 94 depending upon the concentration of the fluid in compartment 92. Float 101 is intended to control the valve 84 to maintain the amount of water in compartment 91 substantially constant. In other words, the amount of water issuing from outlet 85 should be equal to the amount of water leaving the tank through pipe 100 plus the amount of water passing through wall portion 94 into compartment 92. Should now the concentration of the fluid in compartment 92 increase, the water will flow through the wall portion 94 at an increasing rate so that the water will leave the compartment 91 faster than it enters the same, whereupon the float 101 begins to drop thus causing valve 84 to open, admitting more water to the compartment through outlet 85. The movement of this float may be utilized to control the operation of motor 73 and therefore the valve 68 controlling the steam supplied to the regenerator in a manner to prevent the concentration of the fluid leaving the regenerator from exceeding such a high value that the hygroscopic fluid begins to crystallize or freeze, as will be hereinafter explained.

Also mounted within the space 16 is a suitable humidity responsive device generally indicated by the reference character 105. This device may include a humidity responsive element 106 of any suitable character such as hairs, element 106 being connected at its upper end to a lever 107 and at its lower end to a second lever 108. The position of lever 107 may be suitably adjusted by means of an adjusting screw 109. Lever 108 is pivoted on a suitable pivot 110, a spring 111 urging the right-hand portion of the lever 108 upwardly and thus tending to stretch the humidity responsive element 106. Element 106 becomes elongated as the humidity within the space increases whereupon the right end of lever 108 is caused to move upwardly by means of the spring 111, and upon a decrease in humidity within the space 16 the humidity responsive element 106 contracts and the right end of lever 108 moves downwardly against the force of spring 111.

Lever 108 carries an arm 115 which sweeps across a resistance 116 in response to changes in humidity in the space. The upper part of resistance 116 is connected by means of conductors 117 and 118 to the motor terminal 120 which is connected to the end of one of the relay coils in the same manner as terminal 32 of motor 26. The other end of resistance 116 is connected by means of conductors 123 and 124 to the terminal 122 of motor 73 connected to the end of the other relay coil of the motor. A second resistance 125 is arranged to be engaged by an arm 126 connected to the float carrying arm for movement therewith. This arm 126 is connected by means of conductors 127 and 128 to the junction of the relay coils of motor 73. The upper end of resistance 125 is connected by means of a conductor 130 to the arm 115 which passes over resistance 116. With the arm 126 in the extreme upper position of the resistance 125, it will be seen that potentiometer 116 forms the controlling potentiometer for the motor 73, being connected in parallel with the relay coils thereof so that movement of arm 115 over the resistance element 116 causes rotation of motor 73 in one direction or the other an amount corresponding to the amount of movement of the arm 115 over resistance 116. The lower portion of resistance 125 is connected by means of conductors 132 and 124 to the motor terminal 122 so that resistance 125 is in parallel with the relay coil connected between terminals 121 and 122 when arm 126 is in its extreme upper position, as shown. In order that this resistance will have no effect on the motor 73 with the arm 126 in the position illustrated, a resistance element 135 having a resistance value equal to the value of the resistance 125 is connected by means of conductors 118 and 128 to the terminals 120 and 121 so that with the arm 126 in the position shown, the motor is controlled solely by the humidity responsive device 105.

If the humidity in the space 16 increases indicating that more moisture should be removed from the air, arm 115 will be caused to move upwardly over resistance 116 thus decreasing the resistance in parallel with the relay coil connected between terminals 120 and 121 and increasing the resistance in parallel with the relay coil connected between terminals 121 and 122, thus causing motor 73 to rotate in such a direction as to increase the opening of valve 68 in accordance with the increase in humidity in the space whereupon more steam is supplied to the regenerator 65 and the concentration of the fluid leaving the regenerator 65 is increased. Should the concentration of this fluid be raised high enough, it would crystallize which is, of course, undesirable in such a system. An increase in concentration will cause an increase in the flow of water through the wall portion 94 into compartment 92, thus lowering the level of water in 91 and causing float 101 to move downwardly thus causing arm 126 to move downwardly over resistance 125. This downward movement of the float also causes an opening of valve 84 so that the water entering the compartment 91 increases and continues to increase until the water entering the compartment is equal to the water leaving the compartment. The movement of arm 126 downwardly over resistance 125 results in resistance being interposed between the terminal 121 of motor 73 and the arm 115 of humidity responsive device 105, thus desensitizing the effect of the resistance 116 over the motor 73 and decreasing the amount of resistance in parallel with the coil between the terminals 121 and 122 of the motor, whereupon the motor 73 rotates in a direction to move the valve 68 towards closed position until the balancing potentiometer within the motor has balanced the combined effects of resistances 125 and 116 on the motor 73. The desensitizing of the effect of the controller 116 on the motor has the effect of raising the control point of the humidity responsive device so that a higher humidity will be maintained in the space, this control point increasing as the concentration of the fluid within compartment 92 increases. Resistance 125 thereby acts as a limit controller whereby the concentration of the hygroscopic fluid is never permitted to rise above a predetermined value. The arm 126 may cooperate with a suitable scale to give a visual indication of the degree of concentration of the solution in compartment 92.

In a system of this type, it is generally necessary to pass only a portion of the hygroscopic fluid through a regenerator and the amount that is to be passed therethrough is suitably controlled by the valve member 52.

Figure 2:
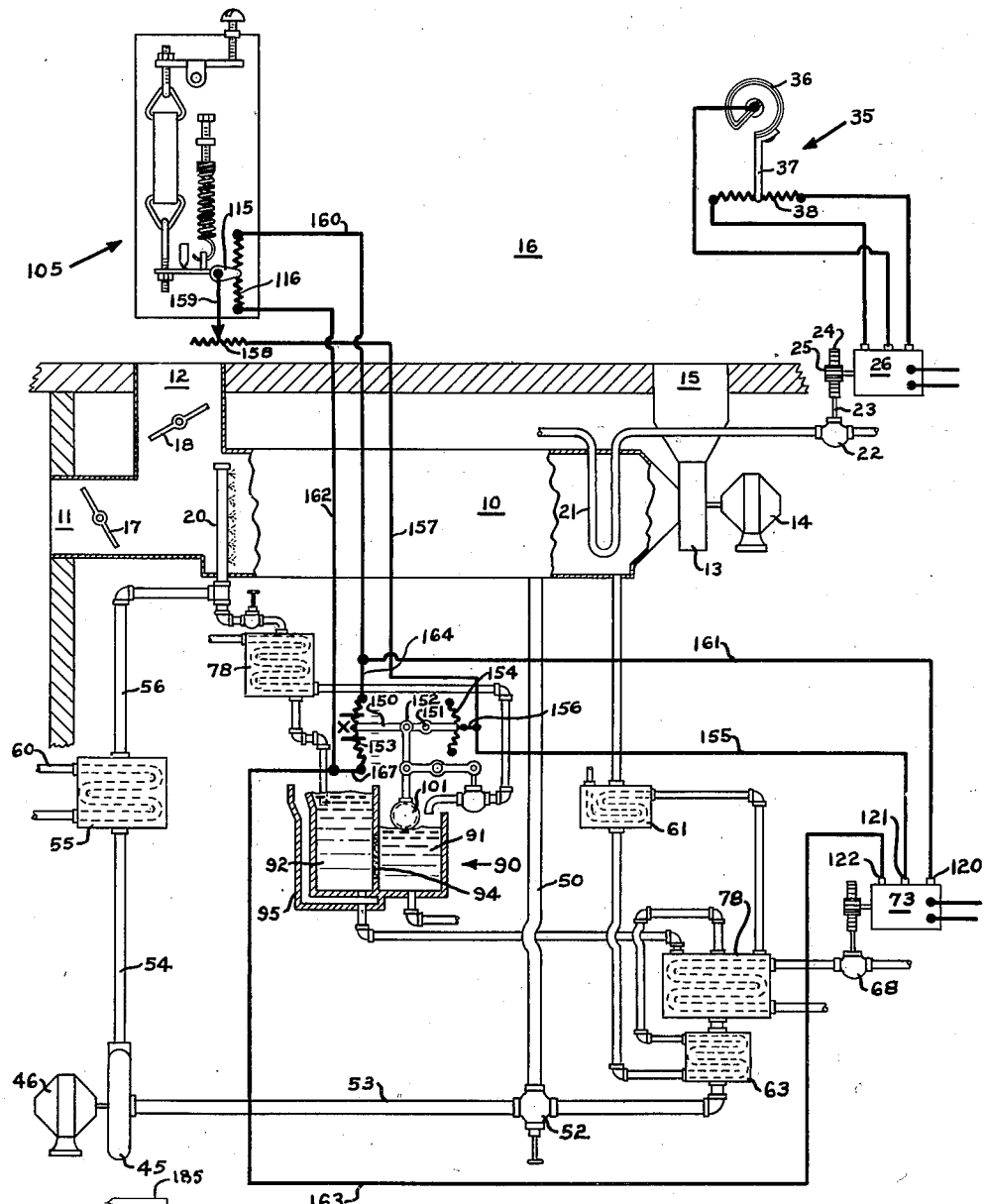
Figure 2 is a diagrammatic view of another form of system embodying our invention.

In the form of invention shown in Figure 2, the flow of steam to the regenerator is controlled directly by the concentration of the hygroscopic fluid and the concentration of the fluid is varied in accordance with the humidity in the space 16, instead of controlling the concentration in accordance with the humidity in the space and utilizing the float 101 as a limit control over the steam valve 68 as in Figure 1. The piping arrangement of the system in this figure is the same as that in Figure 1 except that the fluid in compartment 92 is the mixture of the regenerated and the unregenerated hygroscopic fluid, the connection being taken at the point where pipe 56 connects to the spray 20.

The arm 126 which passes over resistance 125 in Figure 1 is replaced by a lever 150 pivoted at 151 and connected to the float by means of pivot 152. The left portion of this lever passes over a resistance 153 and the opposite extremity of the lever passes over a resistance 154. This latter resistance is tapped at its center and is connected to the terminal 121 of motor 73 by means of conductors 155 and 156. The arm 115 of the humidity responsive device 105 is connected to the terminal 121 of the motor 73 through conductors 155, 157, resistance element 158 and conductor 159, resistance 158 being an adjustable resistance. The upper end of resistance 116 is connected by means of conductors 160 and 161 to the motor terminal 120 whereas the lower portion of resistance 116 is connected by means of conductors 162 and 163 to the terminal 122. The upper end of resistance 153 is connected to the motor terminal 120 by means of conductors 164 and 161 and the lower portion of this resistance is connected to the terminal 122 by means of conductors 167 and 163. It will, therefore be apparent that the potentiometers 116 and 153 are connected in parallel to each other and to the relay coils of the motor 73, the motor being provided with a balancing potentiometer as in Figure 1 to balance the effect of these two potentiometers. By reason of the resistance 158 connected between terminal 121 and control arm 115 of potentiometer 116, this potentiometer is less sensitive than potentiometer 153. In other words, for a small amount of movement of arm 150, arm 115 must move through the entire range of its movement to affect the motor 73 to the same extent. The control range of the arm 150 to cause the motor 73 to move between fully opened and fully closed position is represented by the reference character X.

As the concentration of the fluid within compartment 92 changes, thus causing movement of the float 101 up or down, the motor 73 is caused to move towards open or closed position an amount corresponding to the movement of the float 101, or in other words, to the amount of movement of arm 150 over the resistance 153. If now the humidity in the space 16 should increase, thus causing movement of arm 115 upwardly over resistance 116, the resistance in parallel with the relay coil between terminals 120 and 121 will decrease thus causing the motor to rotate in a direction to open the steam valve 68 more widely. The control point of the potentiometer 153 will now be shifted downwardly so that a greater concentration of the fluid in compartment 92 will be maintained thereby. The resistance 154 has the function of maintaining the same range of movement of arm 150 in order to secure complete opening and closing of the valve 68 regardless of whether the range is in the center as indicated or is shifted upwardly or downwardly. Should now the humidity within the space 16 decrease indicating a need for the removal of less moisture from the air, arm 115 will be moved downwardly over resistance 116 so that the control point of potentiometer 153 will be shifted upwardly whereby the concentration of the fluid in compartment 92 will be maintained at a lower value, it being remembered that as the concentration of the fluid in compartment 92 increases the level of the fluid in compartment 91 decreases for a given rate of flow of fluid into this compartment.

It is therefore, apparent that in this form of the invention, the main control function is performed by the float 101 and is compensated by the control 105 so that the concentration of the fluid being used for dehumidification will be increased as the humidity in the space 16 increases and will decrease as the humidity decreases. The various resistances may be so chosen that when the control arm 115 is in the extreme upper portion of resistance 116 indicating an excessive humidity in the space the control point of the potentiometer 153 will be such that the concentration of the hygroscopic fluid will never exceed a value that will cause crystallization of the fluid.

Figures 3, 4:
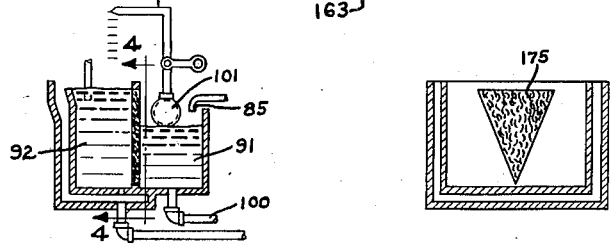
Figure 3 is a modification of a portion of the structure shown in Figures 1 and 2.
Figure 4 is a section taken in the direction of the arrows on line 4—4 of Figure 3.

In Figures 3 and 4, a modification of the tank 90 is illustrated wherein the necessity of using a valve for controlling the supply of water to the compartment 91 is eliminated. In Figures 1 and 2, the osmotic portion 94 of the wall separating the compartments terminated a substantial distance below the top of this wall, the liquid normally rising above the upper extremity of the osmotic portion 94. As the concentration of the solution in compartment 92 increases and the flow of water from compartment 91 into compartment 92 correspondingly increases, the level of the water in the compartment 91 will gradually drop if the amount of water being supplied to the compartment is not increased, and for this reason it was necessary to provide a valve which would supply water to the compartment 91 at the same rate that it should leave the compartment through the wall 94 and through the outlet 100 for the desired concentration of the hygroscopic fluid.

In Figures 3 and 4, the osmotic portion of the wall is represented by the reference character 175, this portion extending in close proximity to the upper portion of the wall separating the two compartments and being of triangular form, as illustrated in Figure 4. The level of the water in compartment 91 will at all times be below the upper extremity of the osmotic portion 175 and the water is fed into compartment 91 at the same rate at all times. If the concentration of the solution in compartment 92 increases, the rate of flow of the water from compartment 91 into compartment 92 will likewise increase and since the water is flowing from the compartment through outlet 100 at a uniform rate, it will be apparent that the water is flowing out of the compartment 91 faster than it is flowing into the compartment. As the level of the water starts to decrease, the portion of the osmotic portion 175 which is available for permitting the passage of water from compartment 91 into compartment 92 wil become less and finally the level of the water will drop to such an extent that the amount of water flowing from compartment 91 into compartment 92 will be substantially the same as before. In other words, while the concentration of the solution in compartment 92 has increased, permitting the water to flow through the portion 175 of the wall separating the compartments at a faster rate, there is a lesser portion of this wall portion 175 available for the water to flow through as the level of the water drops, so that the increase in the rate of flow per unit area through wall portion 175 is compensated for by the decrease in the available portion of this wall through which the water may flow.

It is, therefore, unnecessary to vary the flow of water into tank 91 as the concentration of the solution in compartment 92 increases and the sole function of the float 101 is therefore to operate the arm 126 of Figure 1 or 150 of Fig. 2 to vary the amount of steam supplied to the regenerator in the same manner as in Figures 1 and 2. It will, therefore, be apparent that the tank of Figures 3 and 4 with an osmotic wall portion of triangular shape may be substituted for the tank shown in Figures 1 and 2, the valve controlling the supply of water eliminated and the operation of the systems will not in any way be affected.

An arm 185 operated by the float 101 may cooperate with a suitable scale to give a visual concentration of the solution in compartment 92.

While the fluid being fed into compartment 91 has been described as water, it will be apparent that any suitable solvent for the hygroscopic element in solution in compartment 92 may be fed into the compartment 91. It will also be apparent that the fluid being fed into the compartment 92 in the form of the invention of Figure 2 need not necessarily be taken from the point illustrated but any other suitable point may be chosen.

Having described the preferred forms of our invention it will be apparent that many modifications may become apparent to those skilled in the art, and it should therefore be understood that our invention is limited only by the scope of the appended claims.

We claim as our invention:

1. In a chemical dehumidifying system for controlling the humidity of a space, means utilizing a hygroscopic fluid for removing moisture from the air in said space, regenerating means for increasing the concentration of the hygroscopic fluid after it has become dilute by absorbing moisture from the air, said regenerating means including means for heating at least a portion of the hygroscopic fluid used in the system, electrically operated means in control of the heating means to vary the heating effect thereof, means for controlling the operation of said electrically operated means including first and second variable resistance means, means responsive to the humidity of the air in the space in control of one of said resistance means and means responsive to the concentration of the hygroscopic fluid in control of the other resistance means.

2. In a chemical dehumidifying system for controlling the humidity of a space, means utilizing a hygroscopic fluid for removing moisture from the air in a space, regenerating means for increasing the concentration of the hygroscopic fluid after it has become dilute by absorbing moisture from the air, means including electrical proportioning means responsive to the concentration of the hygroscopic fluid being delivered to the point of utilization thereof for graduatingly controlling the operation of the regenerating means, and means responsive to the humidity of the air in the space electrically connected with said proportioning means for varying the concentration being maintained by the concentration responsive means in accordance with a predetermined schedule.

3. In a chemical dehumidifying system for controlling the humidity of a space, means utilizing a hygroscopic fluid for removing moisture from the air in a space, regenerating means for increasing the concentration of the hygroscopic fluid after it has become dilute by absorbing moisture from the air, means including electrical proportioning means responsive to the concentration of the hygroscopic fluid being delivered to the point of utilization thereof for graduatingly controlling the regenerating means to maintain the concentration thereof within predetermined limits, and means responsive to the humidity of the air in the space electrically connected with said proportioning means for adjusting the limits within which the concentration of the hygroscopic fluid is maintained.

4. In a chemical dehumidifying system for controlling the humidity of a space, means utilizing a hygroscopic fluid for removing moisture from the air in the space, regenerating means for increasing the concentration of the hygroscopic fluid after it has become dilute by absorbing moisture from the air, said regenerating means including means for heating at least a portion of the hygroscopic fluid used in the system, and means for controlling the heating means to control the concentration of the hygroscopic fluid, said means including means responsive to the humidity of the air in the space and means responsive to the concentration of the hygroscopic fluid, said last named means including means responsive to the rate of flow between the hygroscopic fluid and a fluid of known concentration through an osmotic wall.

5. In a chemical dehumidifying system for controlling the humidity of a space, means utilizing a hygroscopic fluid for removing moisture from the air in a space, regenerating means for increasing the concentration of the hygroscopic fluid after it has become dilute by absorbing moisture from the air, said regenerating means including means for heating at least a portion of the hygroscopic fluid used in the system, a chamber divided by a wall, having at least a portion thereof formed of osmotic material, into two compartments, means for feeding hygroscopic fluid into one of said compartments and maintaining said fluid at a constant level, means for feeding a solvent of known concentration into the other compartment, means controlling the flow of solvent into said other compartment in accordance with the rate of flow of the solvent through said wall, means controlled by the flow controlling means for controlling the heating means, and means responsive to the humidity in the space also in control of the heating means.

6. In a chemical dehumidifying system for controlling the humidity of a space, means utilizing a hygroscopic fluid for removing moisture from the air in a space, regenerating means for increasing the concentration of the hygroscopic fluid after it has become dilute by absorbing moisture from the air, said regenerating means including means for heating at least a portion of the hygroscopic fluid used in the system, a chamber divided by a wall, having at least a portion thereof formed of osmotic material, into two compartments, means for feeding hygroscopic fluid into one of said compartments and maintaining said fluid at a constant level, means for feeding a solvent of known concentration into the other compartment, means controlling the flow of solvent into said other compartment in accordance with the rate of flow of the solvent through said wall, means controlled by the flow controlling means for controlling the heating means to maintain the concentration of the hygroscopic fluid in said one compartment between predetermined limits, and means responsive to the humidity of the air in said space for adjusting said limits in accordance with a predetermined schedule.

RAYMOND P. MATTERN.
WILLIAM L. McGRATH.